United States Patent
Nagaura

[11] Patent Number: 5,958,620
[45] Date of Patent: Sep. 28, 1999

[54] CYLINDRICAL BATTERY

[75] Inventor: Toru Nagaura, Fukuoka, Japan

[73] Assignees: Hival Ltd., Fukuoka, Japan; Goldtron Limited, Singapore, Singapore

[21] Appl. No.: 08/900,668

[22] Filed: Jul. 25, 1997

[30] Foreign Application Priority Data

Jul. 31, 1996 [JP] Japan .................................. 8-234624
Oct. 7, 1996 [JP] Japan .................................. 8-302298

[51] Int. Cl.$^6$ ...................................................... H01M 2/08
[52] U.S. Cl. .......................................... 429/164; 429/171
[58] Field of Search ..................................... 429/164, 171

[56] References Cited

U.S. PATENT DOCUMENTS 5,658,356  8/1997  Burns .................................. 429/171 X
5,795,676  8/1998  Kim et al. ................................ 429/164

*Primary Examiner*—Stephen Kalafut
*Attorney, Agent, or Firm*—Kubovcik & Kubovcik

[57] ABSTRACT

To provide a method which allows a battery with a flat base to be produced in a cylindrical battery manufacturing method in which a metallic casing with a larger outside diameter than the outside diameter of the metallic casing in the finished battery is used, a battery element is housed in the said metallic casing, then the outside diameter of the metallic casing reduced; to reduce the occurrence of defective batteries due to deficient electric conduction between the metallic casing and the electrode lead; and to improve the safety of the said cylindrical battery in the event of an outside short circuit. In the making of a battery in which the outside diameter of the metallic casing in the finished battery is A, the outside diameter of the metallic casing used is made to satisfy the relationship $L2 > A \geqq L3$. The battery element, made by winding in a coil shape, is wound so that when winding is completed the end of electrode or electrode current collector of either the negative electrode or the positive electrode is positioned at the outermost periphery of the battery element, then the said battery element is housed in a cylindrical metallic casing, after which the outside diameter of the said metallic casing is reduced to strengthen the contact between the end of electrode or electrode current collector positioned at the outermost periphery of the battery element and the internal wall of the metallic casing, and make the electric resistance of contact between the electrode and metallic casing sufficiently small.

10 Claims, 13 Drawing Sheets

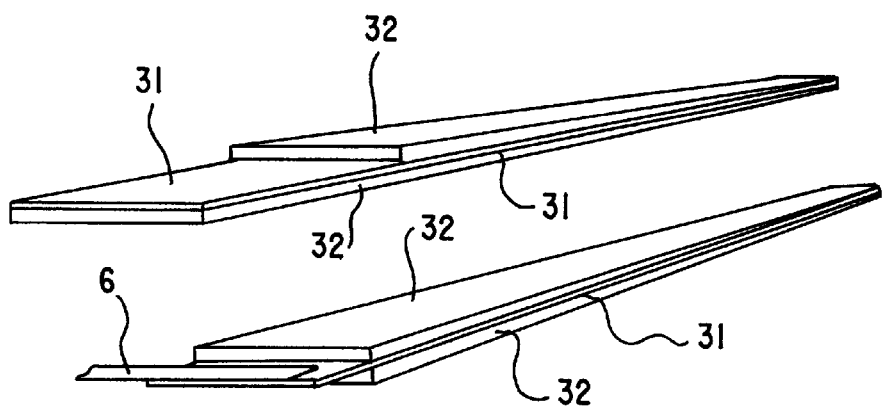
Fig.8(a)
Fig.8(b)
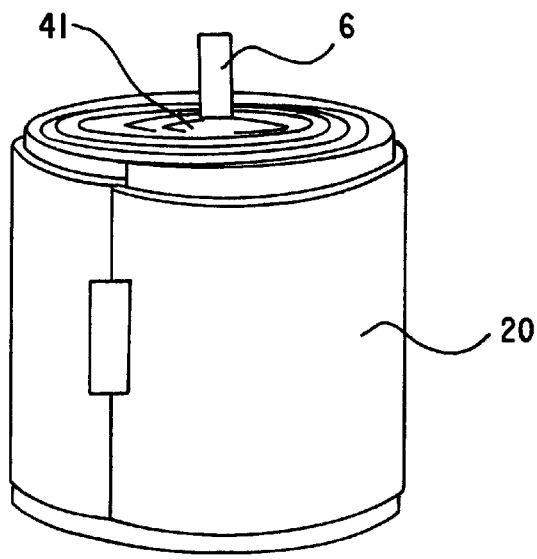
Fig.9(a)
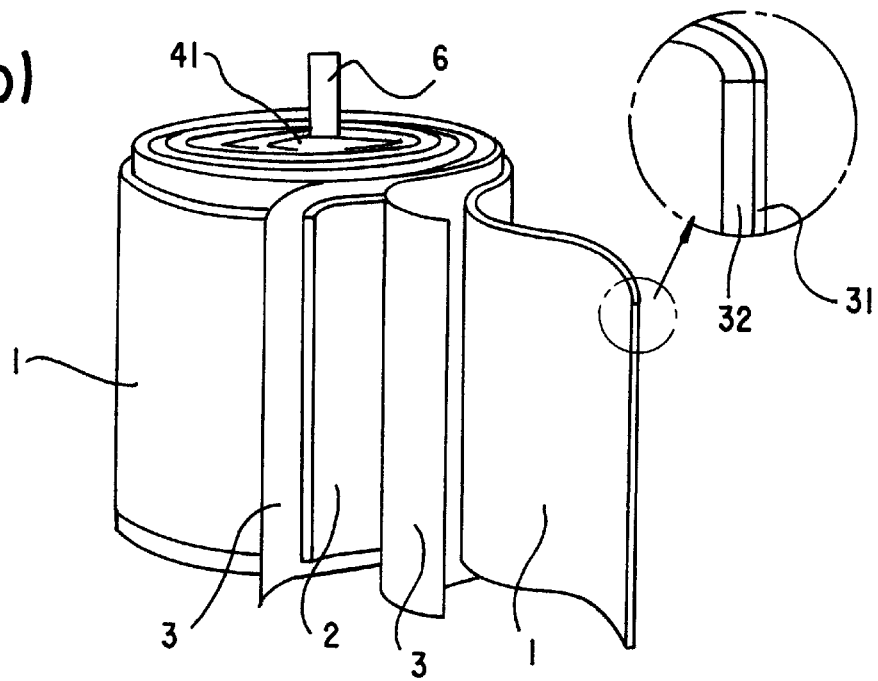
Fig.9(b)

Fig.14(a)
PRIOR ART
Fig.14(b)
PRIOR ART
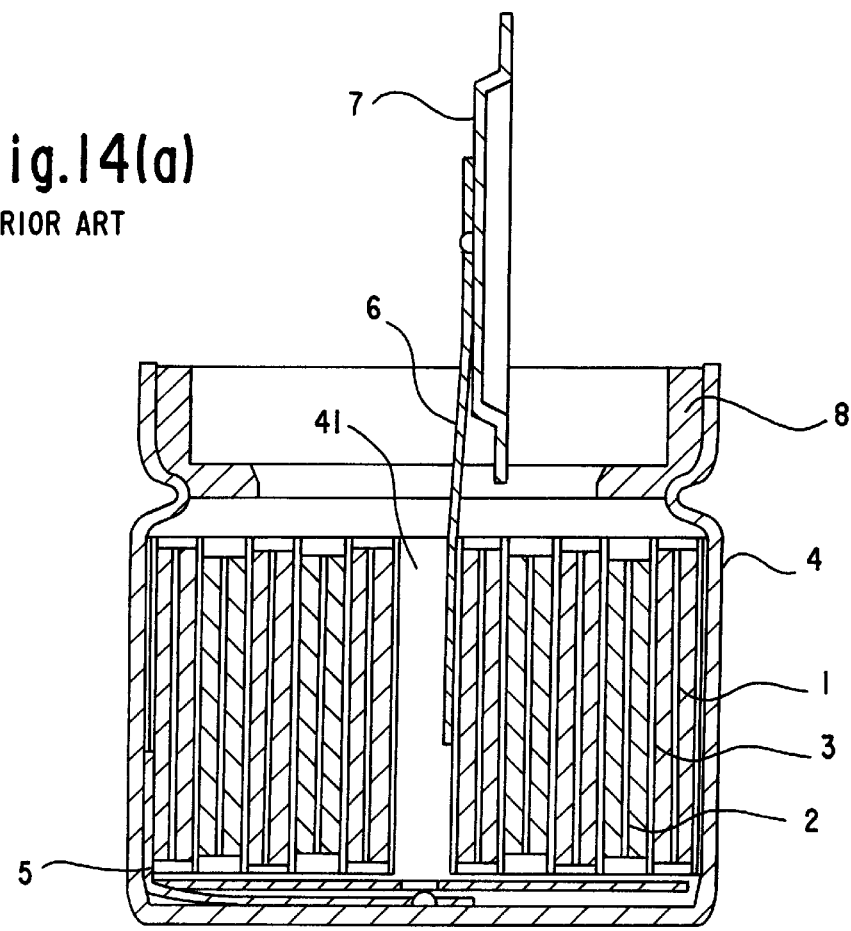
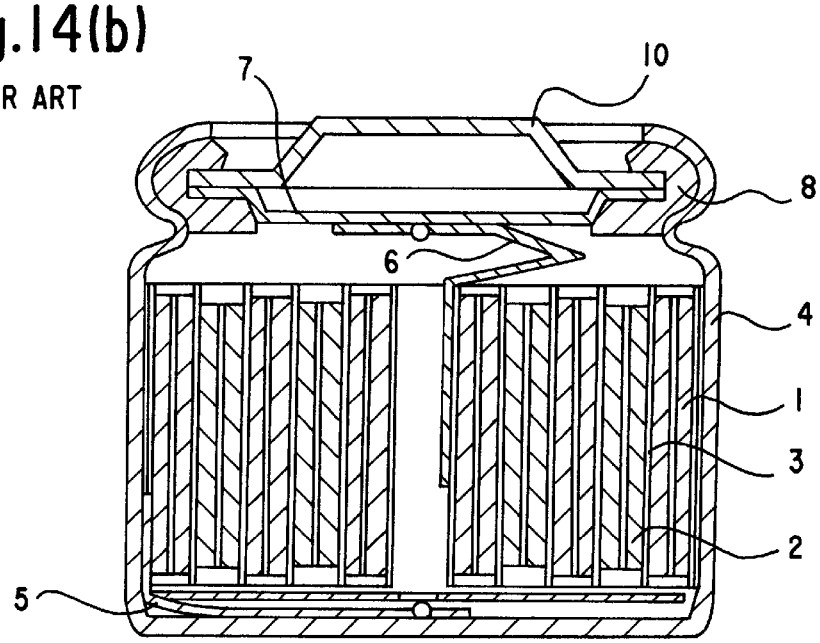

CYLINDRICAL BATTERY

This invention uses a metallic casing, the outside diameter of which is larger than the outside diameter of the metallic casing in the finished battery, and relates to a cylindrical battery made by reducing the outside diameter of the metallic casing after the coiled battery element has been housed in the said metallic casing, being of relevance particularly to the improvement of manufacturing methods and reliability and safety.

The dissemination of and advances in various portable electronic equipment, such as note-book computers and video cameras, has been accompanied by heightened demand for higher performance batteries as drive sources for these, with attention being focused particularly on lithium batteries and lithium ion secondary batteries. As lithium batteries and lithium ion secondary batteries have high voltages, their energy density is also high, contributing significantly to the down-sizing and reduction in weight of portable electronic equipment.

Further movement towards smaller, lighter and more sophisticated portable electronic equipment, however, has given rise to even stronger demands for high performance batteries, and in turn a need to boost energy density, even in lithium batteries and lithium ion secondary batteries, as well as reliability and safety.

To increase energy density a method was proposed which used a metallic casing with outside diameter larger than the outside diameter of the metallic casing in the finished battery, and increased the diameter of the battery element housed inside the metallic casing to boost capacity (JP-A-6-215792). In this method a metallic casing is used which has larger outside diameter (B) than the outside diameter (A) of the metallic casing in the finished battery, and after housing the battery element in the said metallic casing the outside diameter of the metallic casing is squeezed down to the outside diameters (A) of the metallic casing in the finished battery (herein the squeezing of the outside diameter of the metallic casing will be referred to as "Swaging", the machine which squeezes the outside diameter of the metallic casing as a "Swager", and the method of making a cylindrical battery in which the outside diameter of the metallic casing is squeezed, is called "Swage Method").

The use in the Swage Method of a metallic casing with outside diameter larger than that of the outside diameter of the metallic casing in the finished battery allows the diameter of the battery element that is housed in the metallic casing to be enlarged to boost capacity. As is shown in FIG. 2(b), however, a problem arises in the Swaging process in which the bottom of the metallic casing bulges, causing the external appearance to differ from that of conventional batteries (flat bottom). The bulging of the metallic casing bottom is something that is seen in conventional batteries when a defect in the battery has occurred leading to a rise in the battery's internal pressure, while normal batteries have a flat bottom. As batteries with bulged bottom tend to be deemed defective, and this is undesirable, the Swage Method has not yet been put to practical use.

Portable electronic equipment, as typified by note-book computers and video cameras, require enormous amounts of power. When used as power sources for such equipment, non-aqueous batteries are also required to generate large currents.

To create batteries from which large currents can be obtained, the internal resistance of the battery must be reduced as much as possible. Methods for reducing the internal resistance of batteries includes: 1) increasing electrode area, and; 2) reducing the resistance of electrode leads.

In the prior art the use of strip-shaped electrodes has been adopted to increase the area of the electrodes. To increase the electrode area of strip-shaped electrodes it is necessary to reduce the thickness of the electrodes, with metallic foil generally being used as current collectors. That is to say, in the prior art, strip-shaped negative electrode (1) and positive electrode (2), the thicknesses of which have been reduced, are separated by separator (3), and rolled up to form coiled battery element (20), as shown in FIG. 13, with said battery element being housed in cylindrical metallic casing (4), the opening of which has a lid (7) affixed to it via a gasket (8) and is sealed to make a non-aqueous cylindrical battery, as shown in FIG. 14(b).

In conventional non-aqueous cylindrical batteries in which the battery element is coiled, either the positive electrode lead or negative electrode lead taken from the battery element is spot welded to the bottom of the metallic casing to obtain the electrical conduction between the electrode and the metallic casing. In this case, the spot welder's rod-shaped electrode is inserted into the small hole formed in the center of the coiled battery element when winding is conducted, and the electrode lead is welded to the bottom of the metallic casing. Under this method there is just one welding site, welding defects are frequent, and it is not possible to confirm whether the welding is sufficient or not, leading to the problem in a conventional non-aqueous cylindrical battery of cases where the battery does not function due to improper electrical conduction between the metallic casing and the electrode.

In conventional aqueous electrolyte-type nickel-cadmium batteries and nickel-metal hydride batteries also, the battery element is coiled, but a method is used in which the coiled electrode element is made by positioning the end of the negative electrode on the outermost periphery of the coiled electrode element and housing it in a cylindrical metallic casing to allow the aforementioned end of the negative electrode positioned on the outermost periphery of the electrode element to come into contact with the internal wall of the metallic casing, enabling the electrical conduction between the cathode and the metallic casing. As alkaline electrolytes (for example, 30% KOH aqueous solution) have good conductivity, there is no need for unreasonable increases of electrode area, and relatively thick electrodes can be used, giving the electrodes a certain degree of resiliency. Accordingly, at the point in time when the electrode element is housed in the metallic casing the coiled electrode element has coil return due to the resiliency of the electrodes, giving enough contact strength for the electrical conduction between the electrode terminal and the internal wall of the metallic casing.

As the resiliency of electrodes in non-aqueous batteries is weak, however, no method is adopted to bring the end of the electrode into contact with the internal wall of the metallic casing to allow the electrical conduction between the electrode and the metallic casing. In conventional non-aqueous cylindrical batteries (lithium batteries and lithium ion secondary batteries) which use a non-aqueous electrolyte (organic electrolyte) the conductivity of the electrolyte is no more than 1/50 of an alkaline electrolyte, meaning that to create a non-aqueous battery from which a large current can be obtained it is necessary to increase the electrode area immensely, necessitating an extremely thin electrode (100–200 microns). For this reason it is preferable to use metallic foil of no more than 0.03 mm in thickness as current collectors for these electrodes. Electrodes which have metallic foil of no more than 0.03 mm in thickness as the current collector have extremely little resiliency, however, and insufficient resiliency to provide enough return strength to allow electrical conduction between the end of the electrode and metallic casing. Accordingly, the only method adopted for obtaining the electrical conduction between the electrode and metallic casing in conventional non-aqueous cylindrical batteries is to spot weld the electrode lead taken from the electrode element to the bottom of the metallic casing as mentioned previously.

In cases where the electrical conduction between the electrode and the metallic casing is obtained by spot welding the electrode to the metallic casing bottom, sufficient welding cannot be performed if the electrode lead is wet. As such the battery element has to first be put into the metallic casing and the electrode lead spot welded to the bottom of the metallic casing before the electrolyte could be impregnated into the battery element. If the necessary quantity of electrolyte is injected at one time with the battery element already inside the metallic casing it would overflow from the metallic casing, meaning that only a small amount could be injected at one time. In the actual production process, therefore, a considerable amount of time is allowed for the impregnating of the electrolyte, with a little electrolyte being injected each of three to five times, with a vacuum being created for each injection. The electrolyte injection process is a significant barrier in terms of actual mass production.

Additionally, there is a problem with maintaining safety with conventional batteries in which the battery element is coiled. Because large currents can be obtained from coiled battery elements, an accidental external short circuit would result in the flow of an extremely large short circuit current. In such cases all currents which are generated at all electrodes would pass through the electrode leads, with the heating of the electrode leads being a safety problem. There are cases, particularly with non-aqueous batteries (lithium batteries and lithium ion secondary batteries) which use combustible organic electrolyte, in which the electrode leads overheat and become the source of ignition, causing the battery to catch fire.

Accordingly, the reduction of electrode lead resistance is of great importance, not only in reducing the internal resistance of batteries, but also in respect of safety measures that reduce overheating of electrode leads when large currents are flowing through them.

As shown in FIG. 14(b), in conventional cylindrical batteries the negative (or positive) lead (5) which is taken from the coiled battery element is welded to the bottom of metallic casing (4), the battery container (metallic casing) is the external terminal of the negative (or positive) electrode, the lead (6) of the other electrode, that is the positive (or negative) electrode, is welded to lid (7) to allow current to flow to the external terminal (10) of the positive (or negative) electrode. To reduce the resistance of the electrode lead the cross-sectional area of the electrode lead should be increased and the length of the electrode lead shortened but, as shown in FIGS. 13 and 14, due to the way the electrode leads are brought out, the way they are welded to the metallic casing and lid, and welding conditions, in conventional cylindrical batteries the electrode leads are normally limited to a thin metallic plate the width and thickness of which are normally 4–6 mm and 0.04–0.1 mm respectively, and which needs to be reasonably long. That is to say, if the electrode lead is not narrow in width, it would not be possible to bring the lead out of the coil as shown in FIG. 13(a), and if it is too thick proper welding will be difficult. Furthermore, as is shown in FIG. 14, lead (6) is made sufficiently long to allow fitting of lid (7) on the inside of gasket (8), and as lead (5) is welded to the center of the bottom of metallic casing (4) utilizing the hole in the center of the coiled battery element, lead (5) must be long enough to reach an appropriate welding point. In this conventional battery, therefore, it is not possible to sufficiently reduce the resistance value of the electrode lead, leaving an element of uncertainty as to safety in the event of an external short.

One problem that this invention seeks to solve is to realize the manufacture of cylindrical batteries with a Swage Method which produces batteries with a flat bottom, and provide a battery with high energy density. Another problem the invention seeks to address in non-aqueous cylindrical batteries which have battery elements made from coiled, strip-shaped electrodes that have metallic foil of no more than 0.03 mm in thickness as current collectors, is the reduction in defective batteries due to poor electrical conduction between the metallic casing and electrode lead, and the improvement of safety in the event of external shorts of said cylindrical batteries.

A method of solving the first problem is to have the external dimensions of the metallic casing used when making a battery in which the outside diameter of the metallic casing in the finished battery is A, satisfy the relationship L2≦A≧L3. Here L2 is the outside diameter of the central part of the metallic casing, and L3 is the "outside diameter of the casing bottom".

Resolving the second problem entails separating with a separator a strip-shaped positive electrode and negative electrode, which have a metallic foil of no more than 0.03 mm in thickness as a current collector, and winding them up into a jelly roll to make a battery element, the coiling of which is finished so that the end of the electrode or electrode current collector of the negative electrode or positive electrode is positioned on the outermost periphery of said battery element, and housing the said battery element in a cylindrical metallic casing, after which the outside diameter of the said cylindrical metallic casing is reduced to strengthen the contact between the end of electrode or electrode current collector positioned on the outermost periphery of the battery element and the internal wall of the metallic casing, reducing the electrical resistance of contact between the electrode and the metallic casing to a sufficiently small value.

The first invention here proposes a metallic casing, the shape of the bottom and the dimension relationships of which differ from those of conventional metallic casings. FIG. 1(a) is a cross-section of the metallic casing prior to the Swaging used in this invention, and FIG. 1(b) is a cross-section after Swaging. Metallic casings used in this invention are characterized in that they have casing walls perpendicular to the casing bottom, except in the vicinity of the casing bottom where the casing wall slants toward the casing bottom, resulting in two bends in the joining of the casing wall and casing bottom. As shown in the detailed diagram, in FIG. 1(a) the joining of casing wall (12) and casing bottom (11) is accomplished with two bends represented by R1 and R2, thus making it possible to make the "outside diameter of the casing bottom" (L3) sufficiently small in comparison to the outside diameter (L2) of the central part of the metallic casing. More specifically, the characteristic of the metallic casing prior to the Swaging used in this invention is that the outside diameter of the metallic casing (L2=B) is larger than the outside diameter of the metallic casing in the finished battery (L2=A), (B>A), and the "outside diameter of the casing bottom" (L3=C) is no larger than the outside diameter of the metallic casing in the finished battery (L2=A), (A≧C). Therefore, if the metallic casing has the aforementioned dimensional relationship (L2>A≧L3) prior to Swaging, there will be no change in the "outside diameter of the casing bottom" after Swaging, as shown in FIG. 1(b), and thus there will be no bulging of the metallic casing bottom during the Swaging process.

In the second proposed invention there is no need for an electrode lead in at least one of either the negative electrode or the positive electrode in the coiled battery element (20) as shown in FIG. 9. That is, electrodes used in this invention are a strip-shaped electrode to which an electrode lead is not attached as shown in FIG. 8(a), and a strip-shaped electrode to which electrode lead (6) is attached as shown in FIG. 8(b). These are made by inserting a separator and winding the electrode into a coil shape, then as shown in FIG. 9(b), completing the winding so that the end of electrode or electrode current collector (31) of strip-shaped electrode (1) to which an electrode lead is not attached, is positioned at the outermost periphery rather than the separator (3). Electrode lead (6) taken from one of the electrodes of the said battery element is welded to a lid (7; normally also functions to prevent explosions) appropriately installed inside gasket (8), as shown in FIG. 10(a). Following this, the said battery element is impregnated with electrolyte, the battery element housed in cylindrical metallic casing (4), the outside diameter (L2) of which is B, as shown in FIG. 11(a), and the outside diameter (L2) of said cylindrical metallic casing reduced to A, (B>A), as shown in FIG. 11(c), causing the end of the electrode or electrode current collector positioned on the outermost periphery of the aforementioned battery element and the inside of the aforementioned metallic casing to be in very close contact over a broad area. Even with electrodes with poor resiliency that have metallic foil of no more than 0.03 mm in thickness as current collectors, therefore, there is strong contact between the end of electrode or electrode current collector and the inside of the metallic casing, with sufficient electrical conduction between electrode (1) and metallic casing (4) which forms the electrode's external terminal, eliminating the need for an electrode lead for electrode (1).

In cases where the active substance layer on the metallic foil current collector does not have sufficient conductivity also, with the end of the electrode positioned at the outermost periphery, if, as shown in FIG. 8(a), there is an active substance layer (32) on just one side of current collector (31), electrode current collector (31) is positioned on the outermost periphery as shown in the enlarged sectional view of FIG. 9(b) so the said current collector is in close contact with the inside of the metallic casing, allowing for sufficient electrical conduction between the electrode and the metallic casing. Naturally when the active substance layer has sufficient conductivity, with the end of the electrode positioned at the outermost periphery, even when there is an active substance layer on both sides of the current collector, the active substance layer at the outermost periphery will be in close contact with the inside of the metallic casing, enabling sufficient electrical conduction between the electrode and the metallic casing.

A machine marketed under the name Swager may be used to squeeze the outside diameter of the metallic casing. FIG. 15 shows the principle diagram for this machine. Held in die holder (23) and positioned in the center is die (22) which has a hole (21) of $\phi X$ in diameter in the center, and divided into two in the center, to the outside of which are attached several rollers (24) (FIG. 15 shows eight rollers). When die (22), which is split in two, rotates in the direction of the arrow together with die holder (23), it comes into contact with a roller (24) every 45° of rotation, die (22) is tightened to the inside and the central gap in the split die (22) becomes smaller. Further rotation away from the rollers (24) results in the central gap widening. This means that the die (22) split in two, approaches and withdraws, causing the diameter $\phi X$ of the hole in the center of the die to increase and decrease in size. Inserting a cylindrical object into hole (21) in the center of die (22), which rotates, will squeeze the outside diameter of the object when the die (22), split into two, approaches (that is because it is tightened when diameter $\phi X$ of the hole in the center of the die becomes smaller).

Use of the Swager allows the cylindrical battery of this invention to be made by squeezing the outside diameter of the metallic casing. FIG. 16(a) shows a vertical cross-section of the central part of the Swager's rotating die (22). The left and right die approach and withdraw as shown by the arrows. As shown in FIG. 16(b), by inserting metallic casing (4) into the center of the hole in the center of rotating die (22), the outside diameter of the metallic casing can be squeezed to the outside diameter of the metallic casing in the finished battery.

The examples presented below will provide detailed explanations of the aforementioned two inventions.

FIGS. 1(a) and 1(b) show detailed cross-sections of the shape of the metallic casing bottom.

FIGS. 2(a) and 2(b) show detailed cross-sections of the shape of a conventional metallic casing bottom.

FIGS. 3(a)–3(c) show typical cross-sections of a battery in the assembly process.

FIGS. 4(a)–(c) show typical cross-sections of a battery in the assembly process.

FIGS. 5(a)–5(c) show typical cross-sections of a battery in the assembly process.

FIGS. 8(a) and 8(b) show replication of a strip-shaped electrode.

FIGS. 9(a) and 9(b) show replication of a coiled battery element.

Figure 10A:
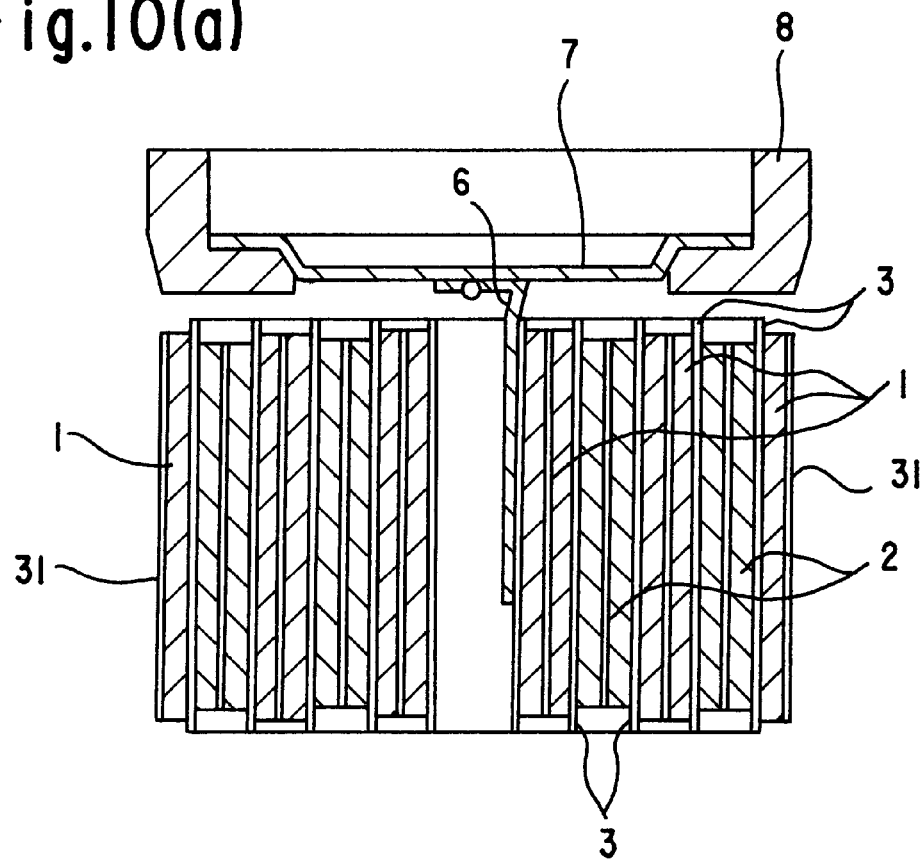
Figure 10B:
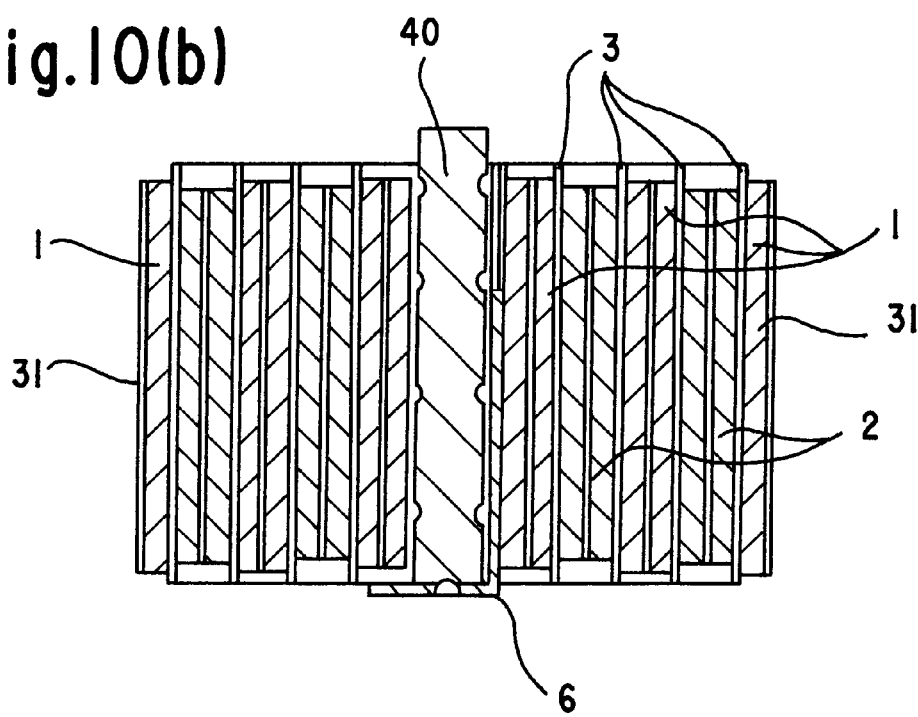

FIGS. 10(a) and 10(b) show cross-sections of a coiled battery element.

Figure 11A:
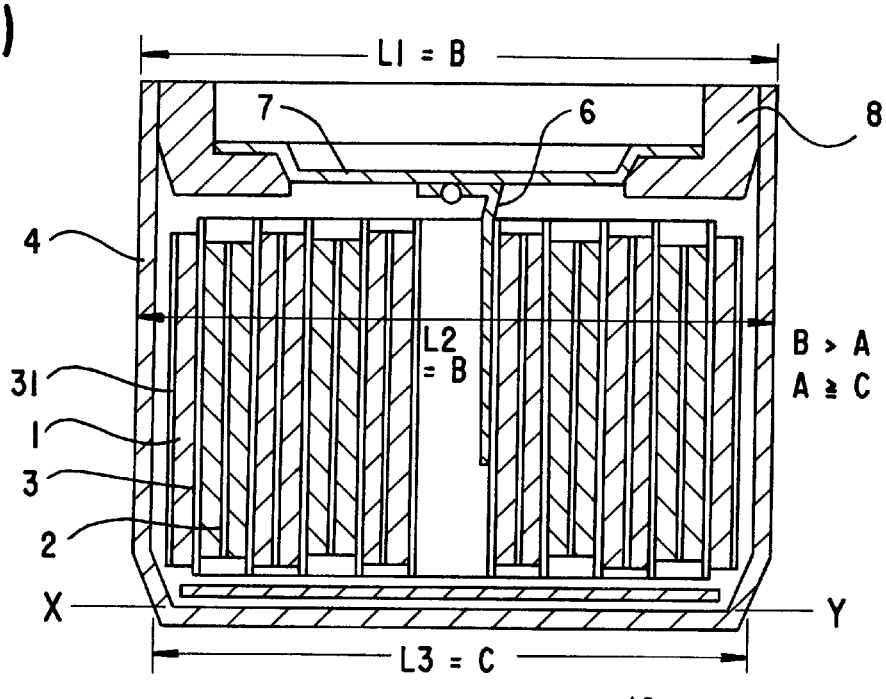
Figure 11B:
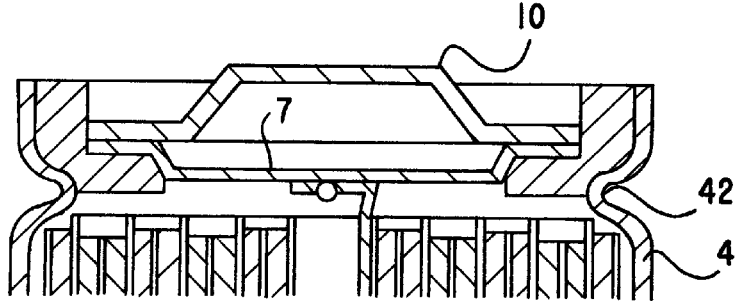
Figure 11C:
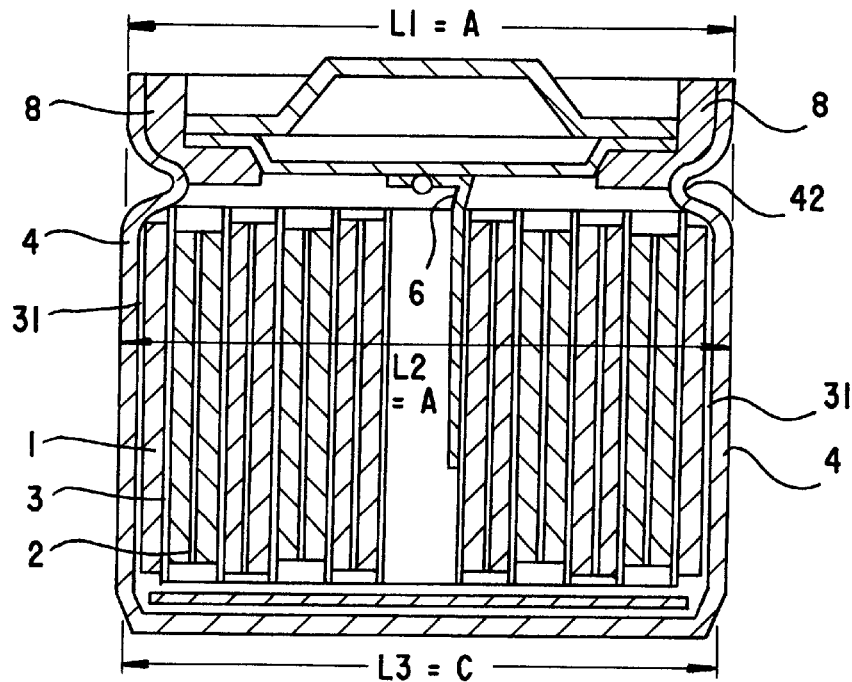

FIGS. 11(a)–11(c) show cross-sections of a battery in a sealing process.

Figure 12A:
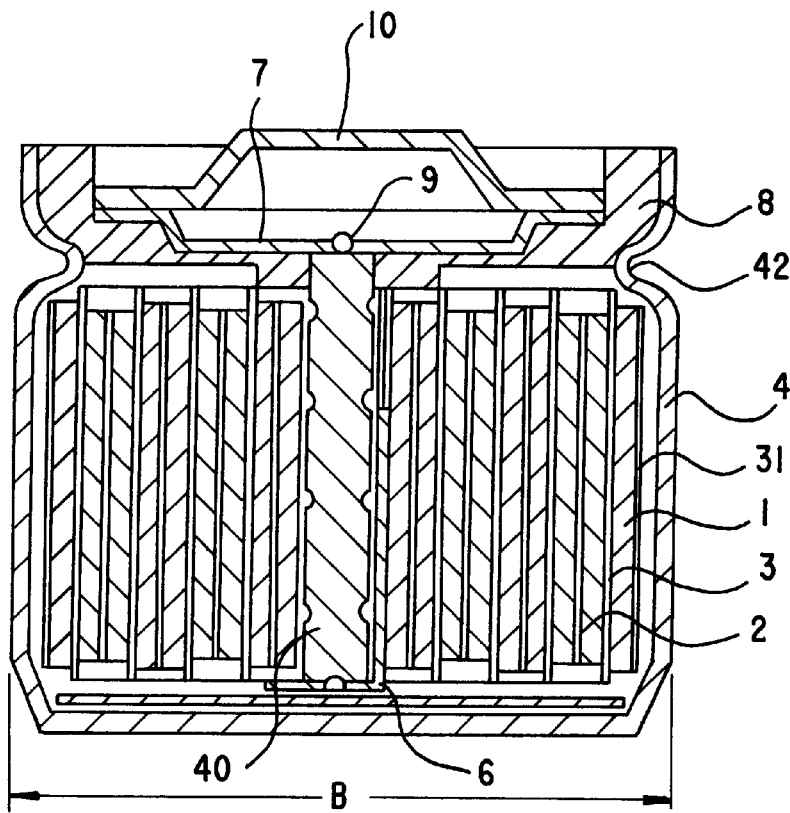
Figure 12B:
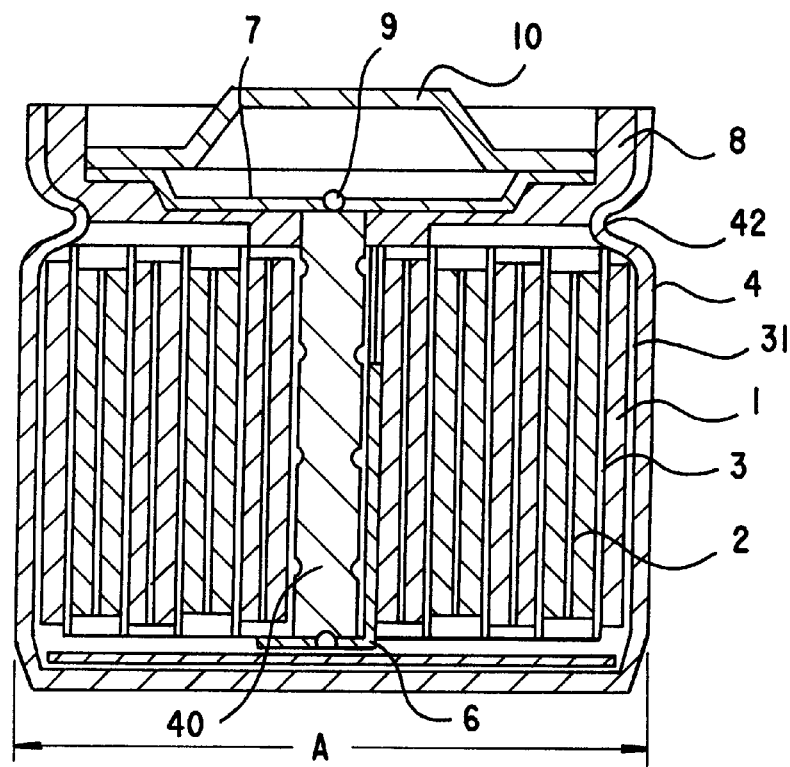

FIGS. 12(a) and 12(b) show cross-sections of a battery in a sealing process.

Figure 13A:
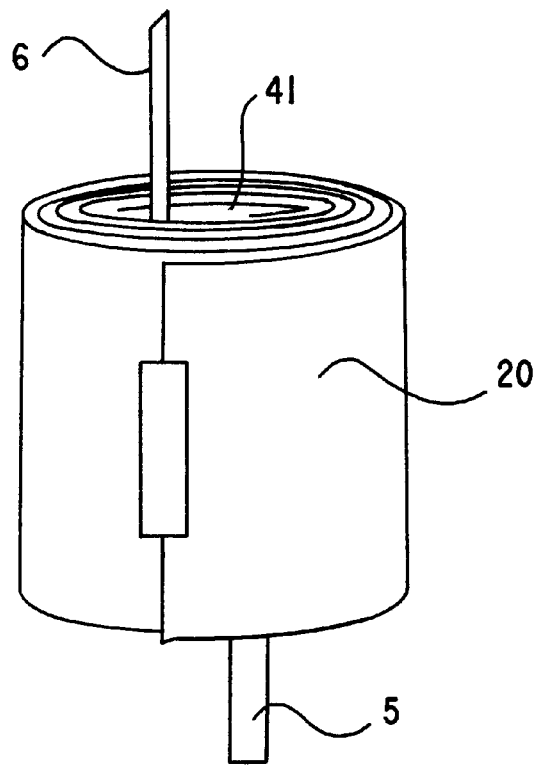
Figure 13B:
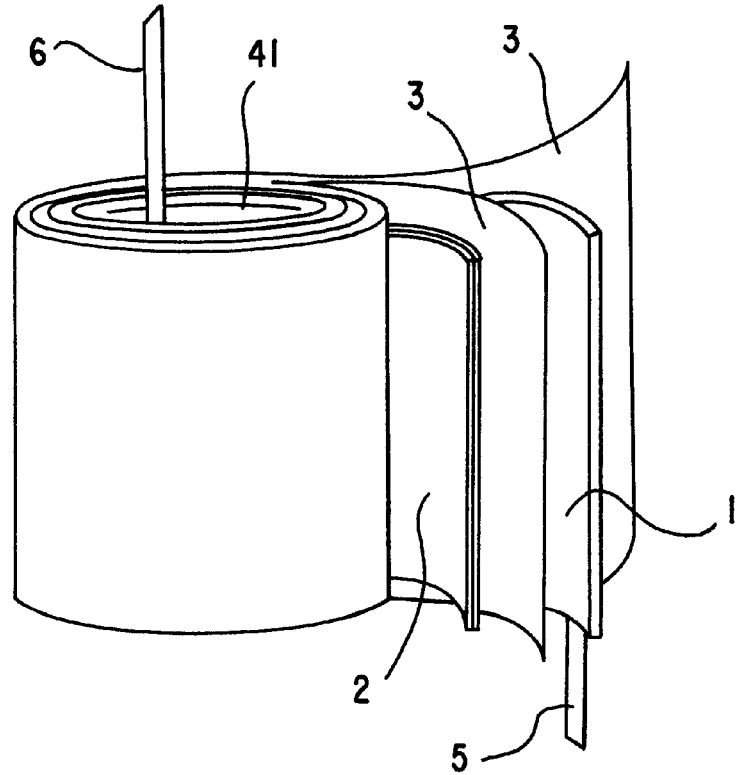

FIGS. 13(a) and 13(b) show cross-sections of a conventional coiled battery element.

FIGS. 14(a) and 14(b) show cross-sections of a battery in a conventional sealing process.

Figure 15:
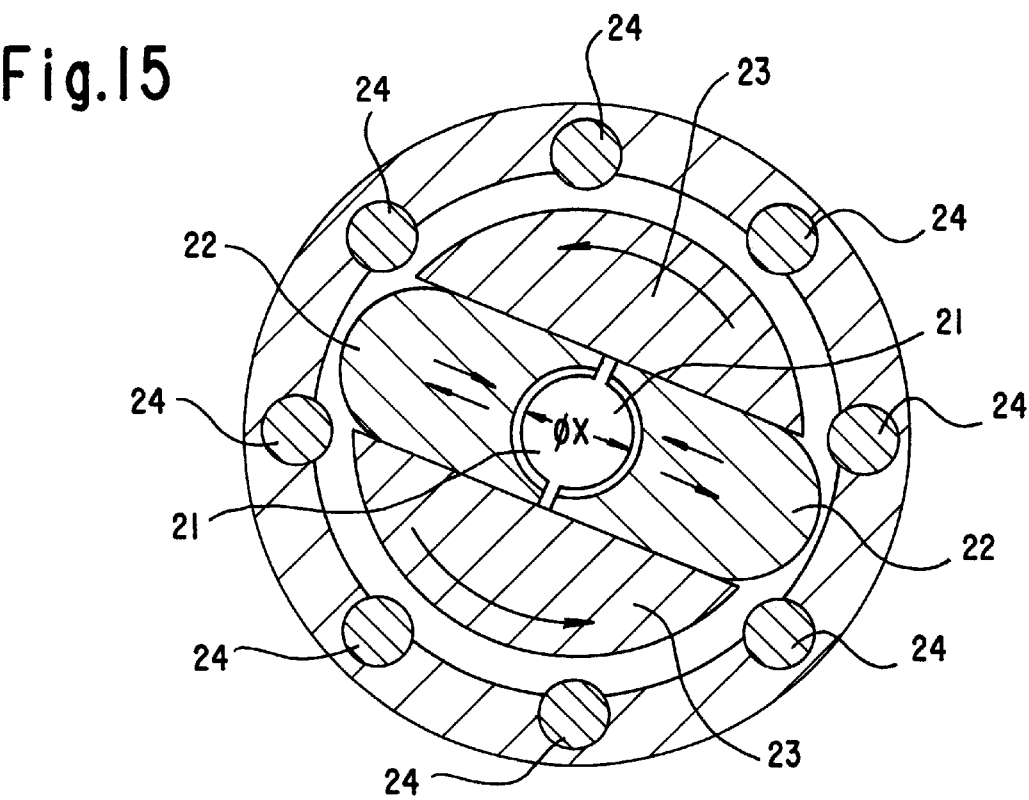

FIG. 15 shows a principle figure of a Swager.

Figure 16A:
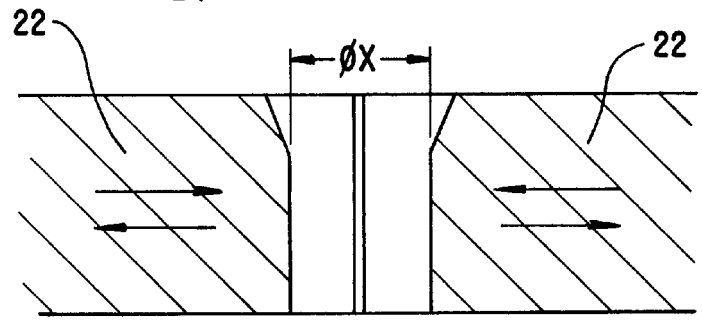
Figure 16B:
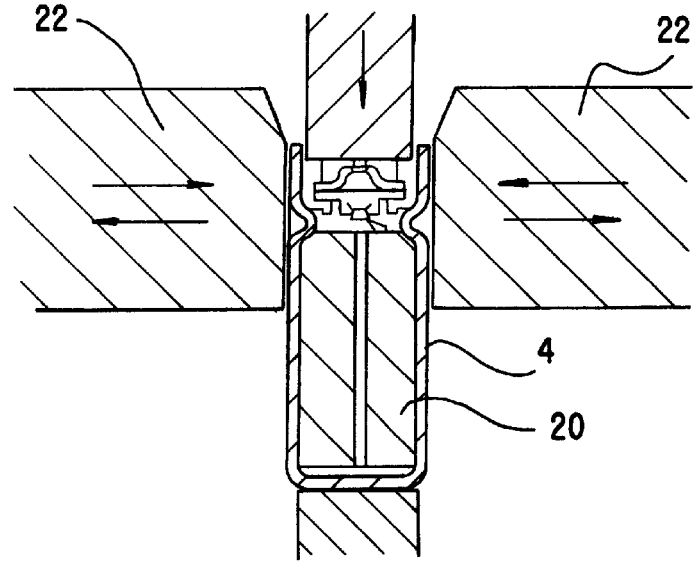

FIG. 16(a) and 16(b) show a principle figure of Swaging.

1 Negative electrode
2 Positive electrode
3 Separator
4 Metallic casing
5 Negative electrode lead
6 Positive electrode lead
7 Sealing cap
8 Gasket
9 Central welding point of cap
10 Positive external terminal
11 Casing bottom
12 Casing wall
15 PTC element
20 Battery element
21 Die hole
22 Die
23 Die holder
24 Roller 31 Current collector
32 Active substance layer
40 Aluminum rod
41 Hole in center of coil
42 Striations

EXAMPLE 1

The specific battery manufacturing procedures for the first invention will be explained with reference to FIGS. 1(a), 1(b), 3(a)–3(c) and 4(a)–4(c). The battery element for the implementation of this invention is prepared in the following manner.

First the negative electrode is prepared under the publicly known conventional method as follows. Combine 87 parts by weight of mesocarbon micro beads (d002=3.37 Å) which have been heat treated at 2800° C. with 3 parts by weight of acetylene black and wet blend with 10 parts by weight of polyvinylidene fluoride (PVDF) as a binding agent and N-methyl-2-pyrrolidone as solvent to make a wet slurry. Next, apply the slurry evenly to both surfaces of a copper foil of 0.01 mm in thickness which is to be the negative electrode current collector, and once it has dried, conduct pressurized casting with a roll press to form a strip-shaped negative electrode. Have part of the current collector exposed at one edge of the strip-shaped negative electrode and onto it weld a nickel negative electrode lead.

The positive electrode is also made under the publicly known conventional method as follows. Mix together manganese dioxide ($MnO_2$) available on the market and lithium carbonate ($Li_2CO_3$) in a ratio of 1 mol:0.275 mol, and bake in air at 800° C. for approximately 12 hours. Repeat the baking process three times to synthesize a spinel-type lithium-manganese compound oxide. Make this spinel type lithium-manganese compound oxide into powder form with an average particle size of 0.025 mm, and to 89 parts by weight of this powder mix 3 parts by weight of acetylene black and 4 parts by weight of graphite as conduction agents, and then wet blend with N-methyl-2-pyrrolidone into which 4 parts by weight of PVDF has been dissolved as a binding agent, to form a slurry. Next, apply the slurry evenly to both surfaces of an aluminum foil of 0.02 mm in thickness which is to be the positive electrode current collector, and once it has dried, conduct pressurized casting with a roll press to form a strip-shaped positive electrode. Have part of the aluminum exposed at one edge of the strip-shape positive electrode and onto it weld an aluminum positive electrode lead.

Figure 1A:
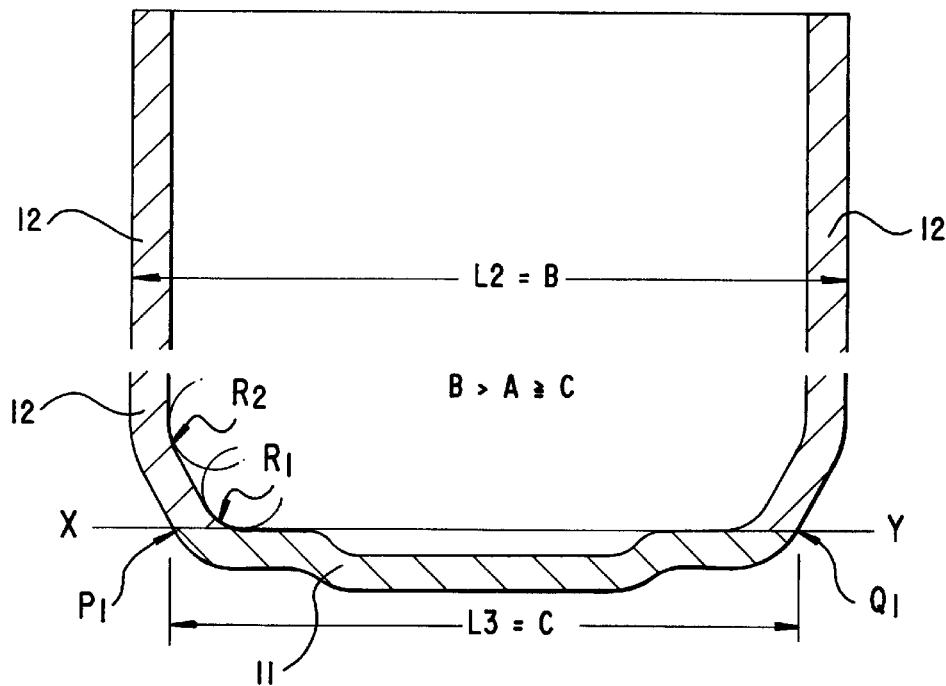
Figure 1B:
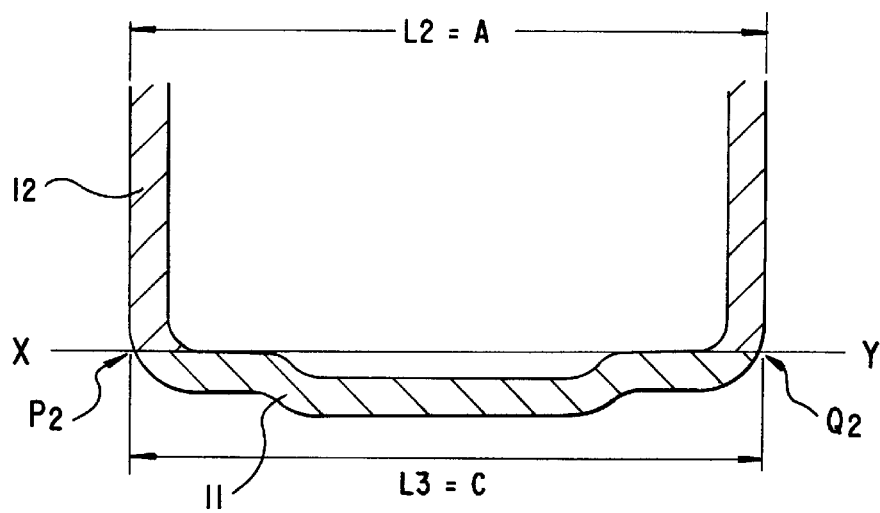
Figure 2A:
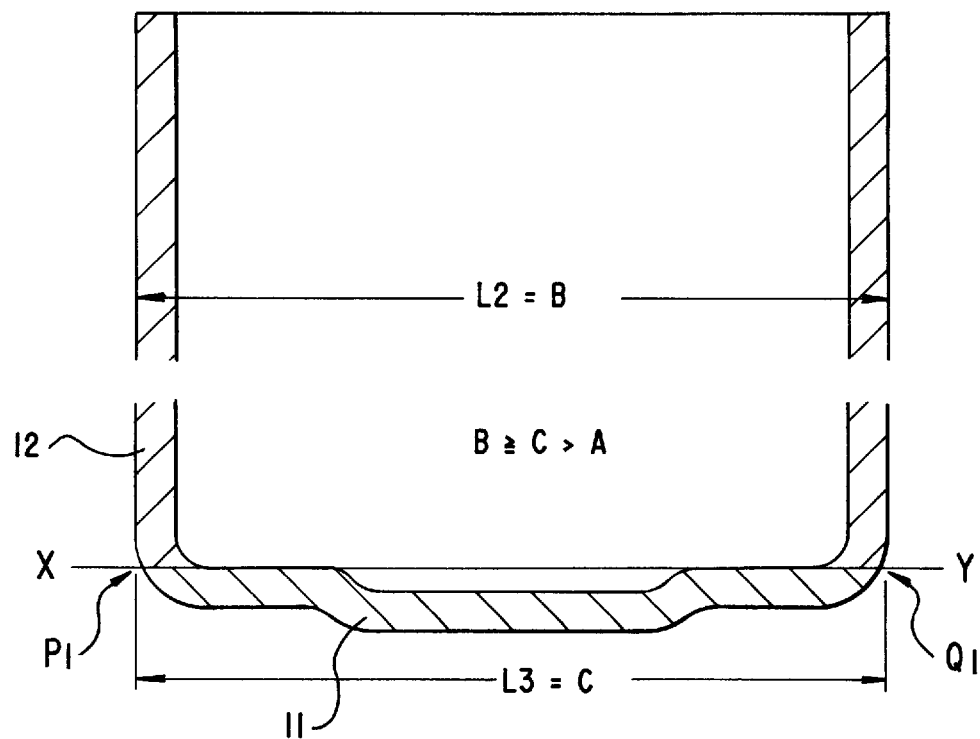
Figure 2B:
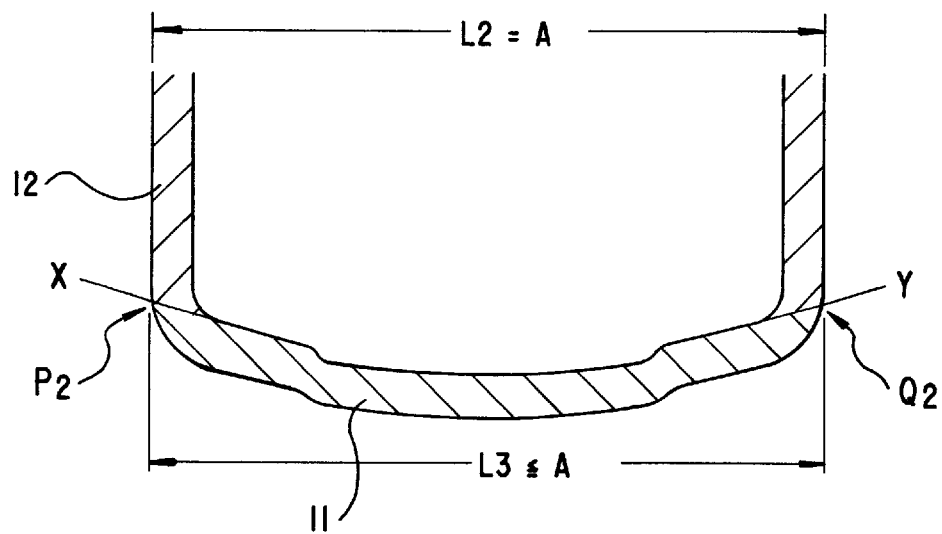
Figure 3A:
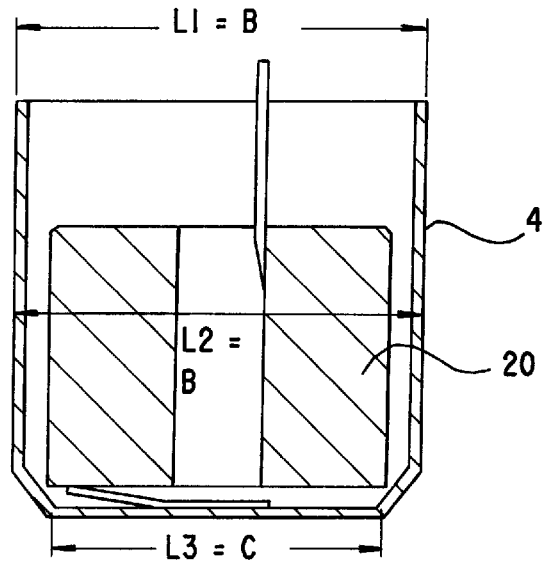

Insert a porous, polypropylene separator between the prepared negative and positive electrodes and roll up to create a battery element (20) with an average outside diameter of 17.4 mm. Then battery element (20) is housed in metallic casing (4), as shown in FIG. 3(a). This embodiment seeks to make a battery in which the outside diameter (L2) of the metallic casing in the finished battery is 18.0 mm, while the metallic casing used is a nickel-plated iron casing with an outside diameter at the opening (L1) and outside diameter at the center part (L2) of 18.5 mm, "outside diameter of the casing bottom" (L3) of 17.5 mm, and a height of 65 mm. The bottom of the said metallic casing is shown in the detailed diagram of FIG. 1(a). FIG. 1(a) shows that it has two bends represented by R1 and R2 at the joint of casing wall (12) and casing bottom (11), making it possible to make the "outside diameter of the casing bottom" (L3) sufficiently small in comparison to the outside diameter of the center part of the metallic casing (L2). That is, the characteristic of the metallic casing prior to the Swaging used in this embodiment is that the outside diameter of the metallic casing (L2=B=18.5 mm) is larger than the outside diameter of the metallic casing in the finished battery (L2=A=18.0 mm), (B>A), and the "outside diameter of the casing bottom" of the metallic casing (L3=C=17.5 mm) is no more than the outside diameter of the metallic casing in the finished battery (L2=A=18.0 mm), (A≧C).

Figure 3B:
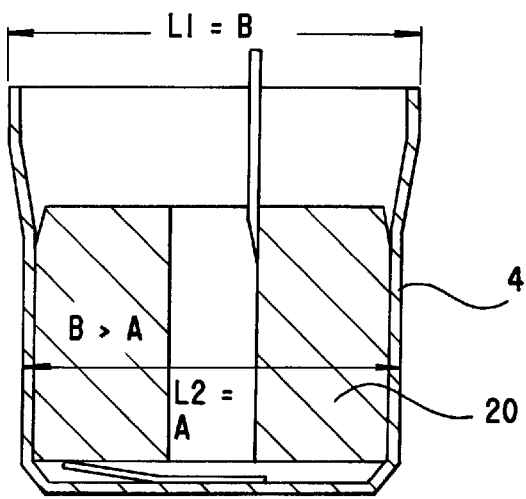

On the other hand, the outside diameter of the battery element is 17.4 mm, and the inside diameter of the aforementioned metallic casing 17.9 mm, making the outside diameter of the battery element 0.5 mm smaller than the inside diameter of the casing, and allowing easy insertion of the battery element into the metallic casing. Swaging is conducted after battery element (20) is housed in metallic casing (4), and the outside diameter of the metallic casing (except the area around the casing opening) reduced to 18.0 mm, as shown in FIG. 3(b). As the "outside diameter of the casing bottom" (L3) of the metallic casing remains unchanged at 17.5 mm even after Swaging, as shown in the detailed diagram of FIG. 1(b) the casing bottom of the metallic casing does not bulge in the Swaging process.

Figure 3C:
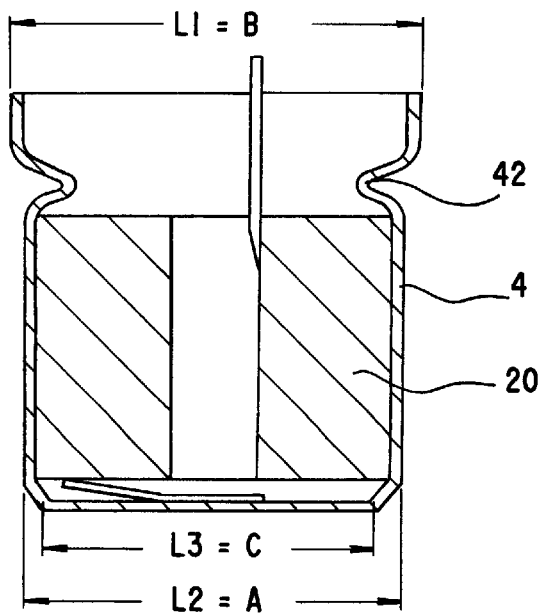
Figure 4A:
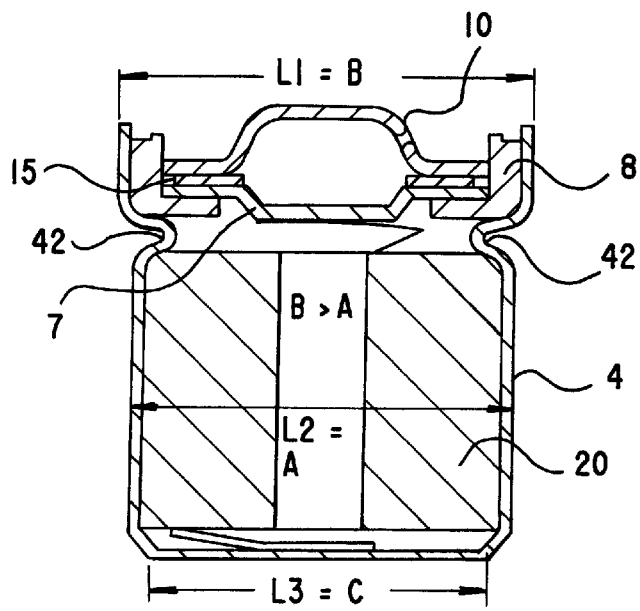
Figure 4B:
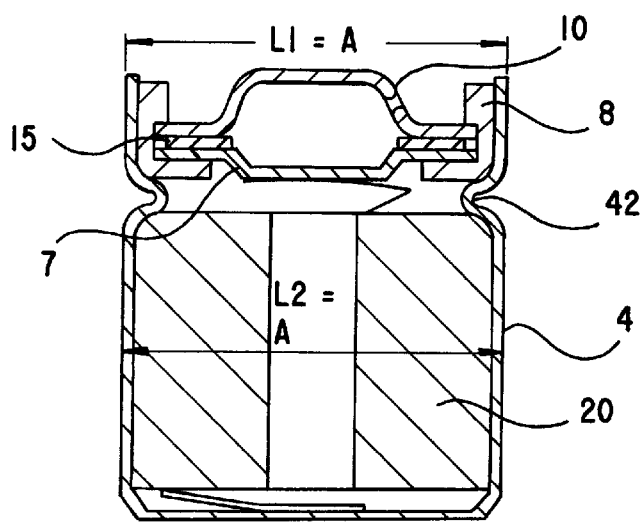
Figure 4C:
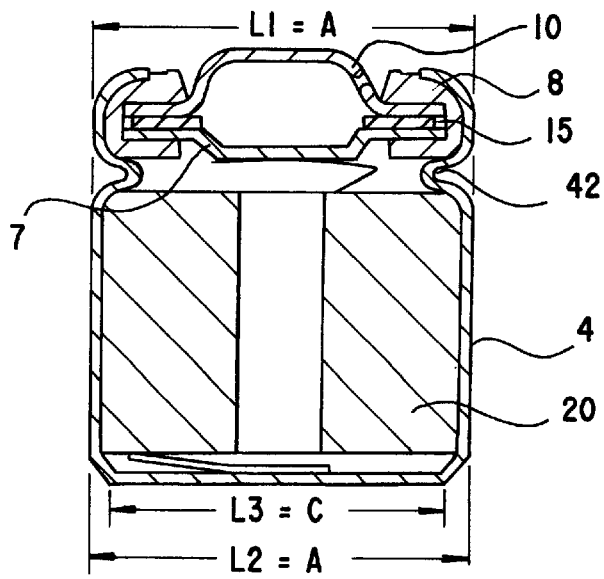

Following this, the metallic casing is squeezed at a position 60.5 mm from the casing bottom (near the metallic casing opening), as shown in FIG. 3(c), and striations (42) to support the gasket are created. After this the process shown in FIG. 4(a) to (c) is followed to assemble the battery. That is, gasket (8) is installed in the opening of the metallic casing, and the negative lead and positive lead are welded to the casing bottom and aluminum sealing lid (7; also acts as an explosion-proof valve), respectively, as shown in FIG. 4(a). Next, electrolyte is injected, sealing lid (7) fitted to the gasket, doughnut-shaped PTC element (15) laid on top of and in contact with the sealing lid, positive external terminal (10) laid on top, and the Swager used once again to squeeze the outside diameter of the metallic casing opening (L1) to the same size as the outside diameter of the central part of the metallic casing (L2) (FIG. 4(b)). Finally, the caulking machine is adjusted to a level where the tightening pressure will not damage the functions of the PTC element, and the edge of the metallic casing caulked and sealed to make battery (U) having the battery structure shown in FIG. 4(c) with an outside diameter of 18.0 mm, a height of 65 mm, and a flat bottom.

EXAMPLE 2

Figure 5A:
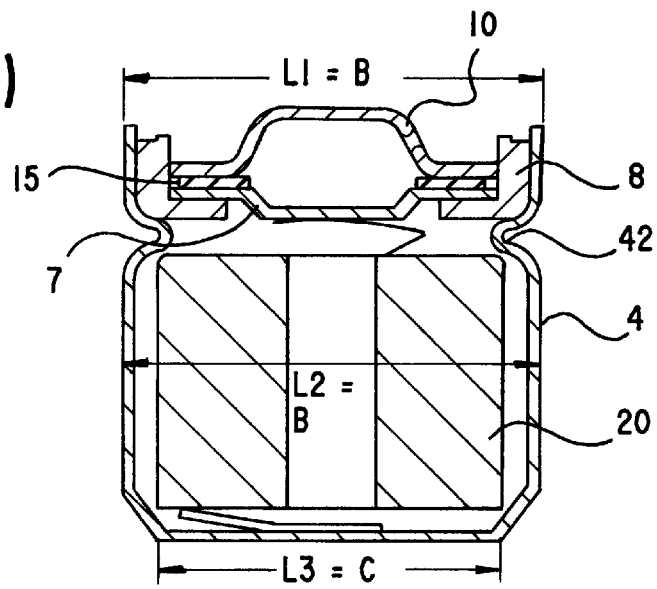
Figure 5B:
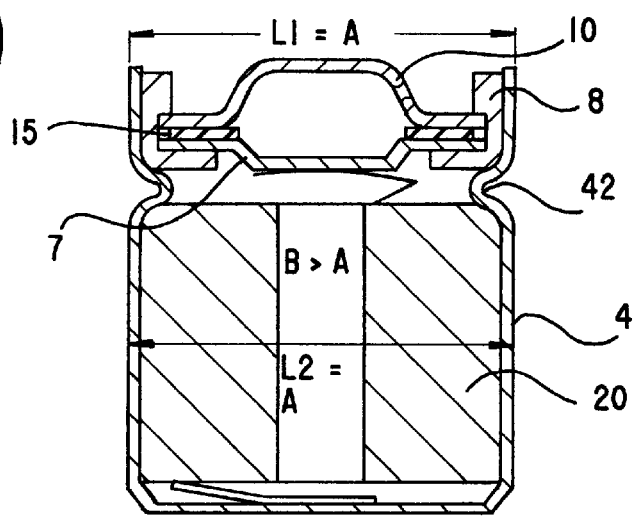
Figure 5C:
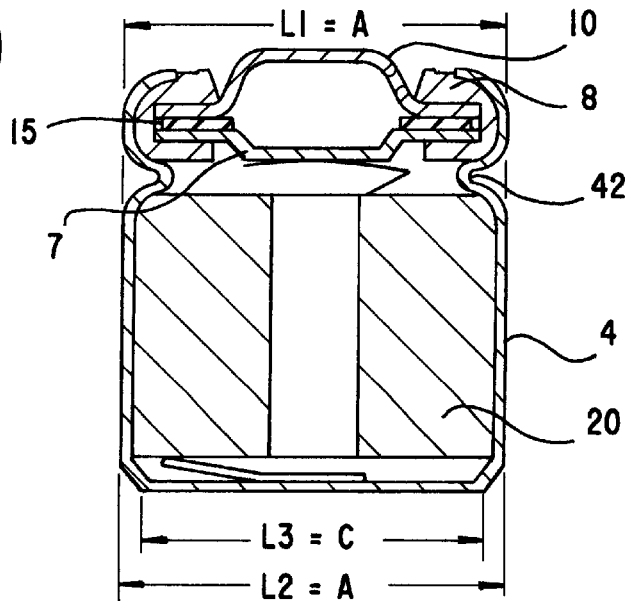

Another specific example of the first invention will be explained with reference to FIGS. 5(a)–5(c). First, battery element (20) with an average outside diameter of 17.4 mm is made in exactly the same way as in Example 1. This example also seeks to make a battery in which the outside diameter of the metallic casing in the finished battery (L2) is 18.0 mm using the same metallic casing that was used in Example 1. Battery element (20) is housed in this metallic casing and, as shown in FIG. 5(a), the metallic casing is squeezed at a position 60.5 mm from the casing bottom (near the metallic casing opening), and striations (42) to support the gasket are created. At the point in time when the striations are created the relationship between the outside diameter of the metallic casing opening (L1) and the outside diameter of the central part of the metallic casing (L2) is L1=L2=18.5 mm. Next, as shown in FIG. 5(a), gasket (8) is installed at the opening of the metallic casing, and the negative lead and positive lead welded to the casing bottom and sealing lid (7; also acts as an explosion-proof valve), respectively, as shown in FIG. 5(a). Next, the same electrolyte as example 1 is injected, sealing lid (7) fitted in the gasket, doughnut-shaped PTC element (15) laid on top of and in contact with the sealing lid, positive external terminal (10) laid on top, and the Swager used to squeeze the entire outside diameter of the metallic casing from the bottom to the opening to reduce the outside diameter of the metallic casing to 18.0 mm (FIG. 5(b)). As shown in the detailed diagram of FIG. 1(b), the bottom of the metallic casing after Swaging has an "outside diameter of the casing bottom" (L3) which remains unchanged at 17.5 mm even after Swaging, thus the bottom of the metallic casing does not bulge in the Swaging process. Finally, the caulking machine is adjusted to a level where the tightening pressure will not damage the functions of the PTC element, and the edge of the metallic casing caulked and sealed to make battery (V) with a structure having an outside diameter of 18.0 mm and a height of 65 mm as shown in FIG. 5(c).

As presented above, the Swage Method has been used also in Example 2 to make battery (V). This differs from batteries made with a conventional Swage Method in that there is no building at the casing bottom of the metallic casing, enabling a battery with frat casing bottom to be made.

Furthermore, although the creation of a lithium ion secondary battery using lithium-manganese oxide as the positive electrode active substance and carbon material as the negative electrode active substance was indicated as a specific embodiment of the first invention in Examples 1 and 2; this invention is essentially concerned with proposals for methods of making cylindrical batteries, and can naturally be applied to making cylindrical batteries for other battery systems.

EXAMPLE 3

Specific procedures for making batteries will be explained in relation to the second invention, with reference to FIGS. 6, and 8 to 11. Preparation of the battery element to implement the second invention differs from a conventional method and is as follows.

First dry blend 70 parts by weight of mesocarbon micro beads (d002=3.37 Å) which have been heat treated at 2800° C. with 20 parts by weight of pitch coke, then wet blend with N-methyl-2-pyrrolidone, into which 10 parts by weight of polyvinylidene fluoride (PVDF) has been dissolved as a binding agent, to create a negative electrode slurry. Apply the negative electrode slurry evenly to both sides of copper foil of 0.01 mm in thickness which is to be the negative electrode current collector, leaving only 56 mm on one side of the copper foil uncoated, as shown in FIG. 8(a). Once it has dried, conduct pressurized casting with a roll press to prepare strip-shaped negative electrode (1) which has a high-density active substance layer (32) on current collector (31). As shown in FIG. 8(a), the end of electrode of prepared strip-shaped negative electrode (1) has no active substance layer on one side surface of the current collector, with current collector (31) exposed.

The positive electrode is made under the publicly known method as follows. A spinel-type lithium-manganese compound oxide is synthesized as in Example 1. Make this spinel-type lithium-manganese compound oxide into powder form with an average particle size of 0.015 mm, and to 88 parts by weight of this powder, mix 6 parts by weight of graphite as a conductive agent, and then wet blend with N-methyl-2-pyrrolidone into which 6 parts by weight of PVDF has been dissolved as a binding agent, to form a positive electrode slurry. Next, apply the slurry evenly to both surfaces of an aluminum foil of 0.02 mm in thickness which is to be the positive electrode current collector, and once it has dried, conduct pressurized casting with a roll press to form, as shown in FIG. 8(b), a strip-shaped positive electrode (2) which has a high density active substance layer (32) on current collector (31). As with the positive electrode in Example 1, have part of the current collector of strip-shaped positive electrode (2) exposed at one end and onto it weld aluminum positive electrode lead (6) of 4 mm in width and 0.04 mm in thickness.

Insert a porous, polypropylene separator (3) in between negative electrode (1) and positive electrode (2), and wind into a jelly roll to create a battery element (20) with an average outside diameter of 17 mm, as shown in FIG. 9 (a). As the cross-section of battery elements made by coiling strip-shaped electrodes generally will not be a complete circle, there are maximum and minimum values for the outside diameter of battery element (20), with the maximum outside diameter value for battery element (20) made here being 17.15 mm. When winding, electrode lead (6) attached to the positive electrode is positioned in the center of the jelly roll and, as shown in FIG. 9(b), winding is completed so that the end of electrode with the exposed current collector of negative electrode (1), rather than separator (3), is positioned at the outermost periphery. Additionally, as shown in FIG. 10(a), lead (6) taken from the center of the battery element is welded to lid (7) which is installed inside gasket (8). After this, electrolyte, consisting of a blended solvent of ethylene carbonate (EC) and diethyl carbonate (DEC) into which 1 mol/1 of LiPF6 has been dissolved, is impregnated into the said battery element, and put into cylindrical metallic casing (4) as shown in FIG. 11 (a).

This embodiment seeks to make a battery in which the outside diameter (A) of the metallic casing of the finished battery is 17.5 mm, while the metallic casing used is a nickel-plated iron casing with an outside diameter at the opening (L1) and outside diameter at the center part (L2) of B=18.0 mm, "outside diameter of the casing bottom" (L3) of C=16.5 mm, and a height of 65 mm. The outside diameter of the metallic casing used in this example (L2=B=18.0 mm) is larger than the outside diameter of the metallic casing in the finished battery (L2=A=17.5 mm), (B>A), and the "outside diameter of the casing bottom" of the metallic casing (L3=C=16.5 mm) is no more than the outside diameter of the metallic casing in the finished battery (L2=A= 17.5 mm), (A≧C).

Figure 6:
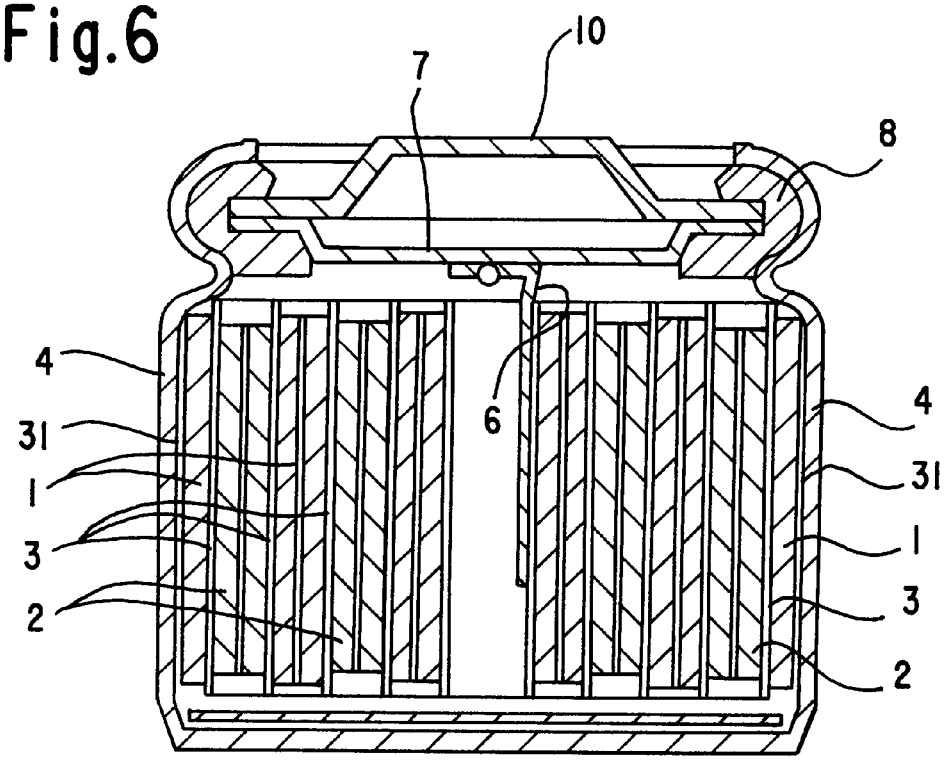
FIG. 6 shows a typical cross-section of a battery.

As a matter of interest, the inside diameter of the aforementioned metallic casing is 17.4 mm, and as the outside diameter of the battery element is made smaller than the inside diameter of the metallic casing the battery element can be easily inserted into the metallic casing. After housing battery element (20) in metallic casing (4), the metallic casing is squeezed down at a point 60.5 mm from the casing bottom, as shown in FIG. 11(b), and striations (42) to support the gasket are created. Following this, positive external terminal (10) is laid on top and in contact with sealing lid (7), and the outside diameter of the metallic casing squeezed to outside diameter of L2=A=17.5 mm, as shown in FIG. 11(c). The edge of the metallic casing is then caulked to create battery (A) with a structure having an outside diameter of 17.5 mm and a height of 65 mm, as shown in FIG. 6.

In battery (A) made in this way, because the battery element (20) is housed in metallic casing (4), after which the outside diameter of the metallic casing is reduced, the end of electrode positioned at the outermost periphery of the battery element is in very close contact over a large area with the internal wall of the metallic casing. Naturally the degree of contact between the end of electrode and internal wall of the metallic casing closely correlates to the degree of change in the outside diameter of the battery element at this time. That is, it can be said that if the maximum value of the outside diameter of the battery element prior to insertion in the metallic casing is D mm, and the maximum value of the inside diameter of the metallic casing after squeezing the outside diameter is d mm, then the greater (D−d) is, the stronger the degree of contact between the end of electrode and the internal wall of the metallic casing. As in this embodiment, D=17.15 mm and d=16.95 mm, (D−d)=0.20 mm and, as shown in the enlarged sectional view of FIG. 9(b), since electrode current collector (31) is positioned at the outermost periphery of the battery element, the said current collector is in appropriate close contact over a large area with the inside of metallic casing (4). Thus, as in this embodiment, by setting (D−d) appropriately, positioning the end of one electrode or current collector at the outermost periphery of the battery element, housing it in a cylindrical metallic casing and reducing the outside diameter of the metallic casing, good electrical conduction can be obtained between at least one electrode, without the need for an electrode lead, and metallic casing (4), which is the electrode external terminal. Furthermore, if (D−d) is too large the battery element may be overly tightened, causing internal shorts. Other experiments confirmed that this value should be 0<(D−d)≦0.3, with this example being (D−d)= 0.20 mm. A preferable range of (D−d) is about 0.1 mm to about 0.25 mm.

In this example also, the outside diameter of the metallic casing prior to Swaging (L2=B) is larger than the outside diameter of the metallic casing in the finished battery (L2=A), (B>A), and the "outside diameter of the casing bottom" of the metallic casing (L3=C) is no more than the outside diameter of the metallic casing in the finished battery (L2=A), (A≧C). As such, there is no change in the "outside diameter casing bottom" (L3) even after Swaging and no bulging of the casing bottom of the metallic casing in the Swaging process.

EXAMPLE 4

Figure 7:
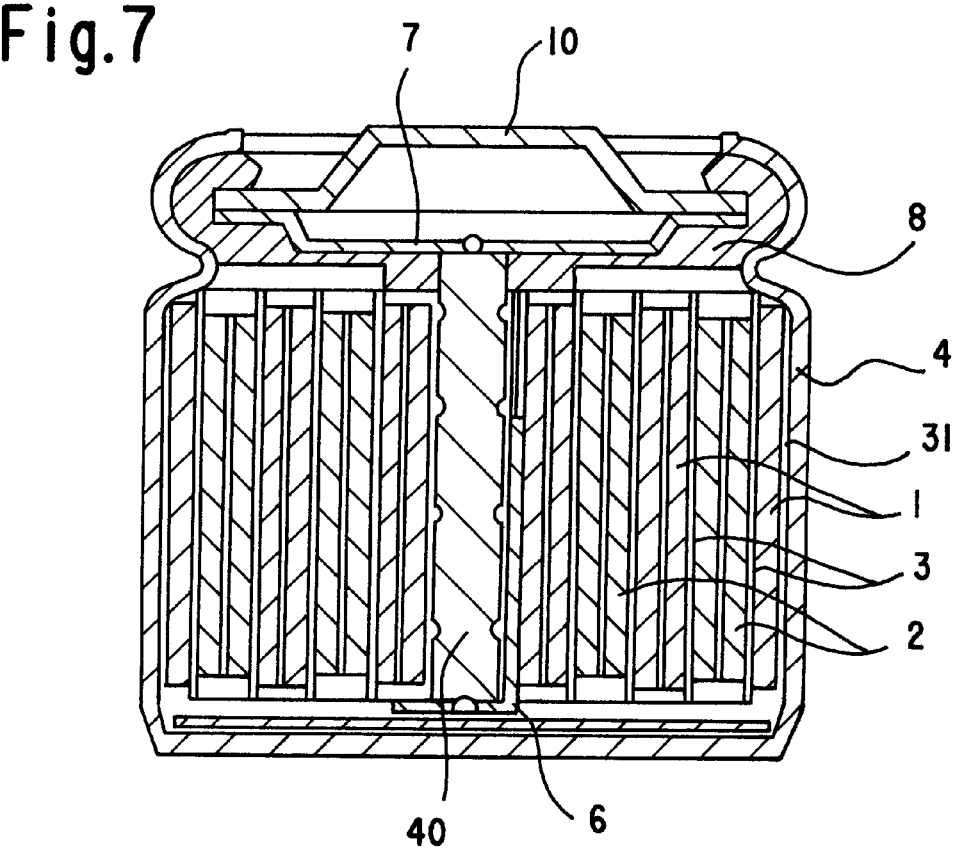
FIG. 7 shows a typical cross-section of a battery.

Another specific example of the second invention will be explained with reference to FIGS. 7 to 10, and 12. A coiled battery element is made in the same manner as Example 3, as shown in FIG. 9(a). An aluminum rod (40) with diameter 4.0 mm is inserted into the center hole (41) of the battery element as shown in FIG. 10(b), and electrode lead taken from the center of the coil is welded to one end of the said aluminum rod. Following this, the same type of electrolyte as was used in Example 1 is impregnated into said battery element and, as shown in FIG. 12(a), the battery element is then housed in the cylindrical metallic casing with the side to which electrode lead (6) is welded facing the casing bottom. This embodiment also seeks to create a battery in which the outside diameter of the metallic casing in the finished battery is 17.5 mm, using the same metallic casing as used in Example 3. After housing the battery element in metallic casing (4), the metallic casing is squeezed in at a point 60.5 mm from the casing bottom, as shown in FIG. 12(a), striations (42) are created to support a gasket, and gasket (8) is installed in the opening of the metallic casing. The other end of the aforementioned aluminum rod is showing from the gasket's central hole, and when lid (7) is fitted inside the gasket the central part of the lid is in contact with the said end of the aluminum rod. Lid (7) is welded to at its center point (9) to the end of the aluminum rod with a laser welder. In the center of the lid used here is created a thinner section in the shape of a cross, so that the lid functions to prevent explosion by splitting and safely releasing internal pressure when internal pressure in the battery rises. Positive external terminal (10) is then laid on top of and in contact with sealing lid (7), and, as shown in FIG. 12(b), the outside diameter of metallic casing B=18.0 mm, is squeezed to A=17.5 mm using the same method as in the aforementioned example. The edge of the metallic casing is then caulked to create battery (B) with a structure having an outside diameter of 17.5 mm and a height of 65 mm as shown in FIG. 7. As electrode lead (6), which is welded to one end of the aluminum rod, is in close proximity to the hole in the center of the coiled battery element it need only be a mere 4 mm in length. In the end, in battery (B) made in this embodiment, electrode lead with a tiny cross-sectional area of 0.16 mm$^2$ has a mere 4 mm lying between the battery element and the external terminal.

This example also seeks to create a battery in which the outside diameter of the metallic casing in the finished battery is 17.5 mm, using the same metallic casing with an outside diameter of 18.0 mm as used in Example 3, and as the end of negative electrode (1) is positioned at the outermost periphery of the battery element, by housing the battery element in the cylindrical metallic casing and reducing the outside diameter of the metallic casing good electrical conduction between the negative electrode and metallic casing (4) is enabled.

In this example also, the outside diameter (B) of the metallic casing prior to Swaging is larger than the outside diameter (A) of the metallic casing in the finished battery, (B>A), and the "outside diameter of the casing bottom" (C) of the metallic casing is no more than the outside diameter (A) of the metallic casing in the finished battery, (A≧C). As such, there is no change in the "outside diameter of the casing bottom" even after Swaging and no bulging of the bottom of the metallic casing in the Swaging process.

COMPARATIVE EXAMPLES

The conventional procedures for making batteries will be explained with reference to FIGS. 13 and 14. In conventional battery-making methods the battery element is prepared as follows.

First, negative electrode (1) and positive electrode (2) are created with the same method as in the aforementioned example, with the current collectors coated with an active substance layer, then pressurized casting is conducted to make strip-shaped electrodes. Under the conventional method, part of the current collector at one end of both the strip-shaped positive electrode and negative electrode are left exposed, to which electrode leads of 4 mm in width and 0.04 mm in thickness are welded.

A separator is inserted between the prepared negative electrode and positive electrode, then this is wound into a jelly roll to make battery element (20) with an average outside diameter of 17.2 mm, as shown in FIG. 13(a). Winding is done so electrode lead (6) attached to positive electrode (2) is positioned in the central part of the coil, and electrode lead (5) attached to negative electrode (1) is positioned at the outside of the coil. When winding is completed, separator (3) is positioned at the outermost periphery, as shown in FIG. 13(b). In the battery element made in this way, negative electrode lead (5) is bent towards the center of the battery element, as shown in FIG. 14(a), the battery element housed in cylindrical metallic casing (4) so negative electrode lead (5) is in contact with the casing bottom, the spot welder's rod-shaped electrode is inserted into hole (41) formed in the center of the coiled battery element when winding is conducted, and negative electrode lead (5) welded to the center of the bottom of the metallic casing. This necessitates negative electrode lead (5) to have sufficient length to reach the center of the casing bottom. Thus, the battery made in this comparative example having an outside diameter of φ18 mm requires a 13 mm negative electrode lead. Lid (7) is welded to positive electrode lead (6) taken from battery element (20) housed in the metallic casing, as shown in FIG. 14(a). This is followed by the injection into the metallic casing a little at a time over five occasions of the same electrolyte as used in Example 1. The method involves a vacuum being created inside the metallic casing each time the electrolyte is injected, after which the electrolyte is injected, followed by pressurization to promote the impregnation of the electrolyte into the battery element. After this, electrode lead (6) is folded, as shown in FIG. 14(b), lid (7) fitted inside gasket (8), positive external terminal (10) laid on top of and in contact with lid (7), and the edge of the metallic casing caulked and sealed to create battery (C) with the battery structure of an outside diameter of 18 mm and a height of 65 mm, as shown in FIG. 14(b).

In battery-making procedures under this conventional method, electrode lead (6) needs to be long enough to fold to ensure the appropriate installment of lid (7) in the process of installing lid (7) inside gasket (8). The length electrode lead (6) needs to be in order for it to be folded differs according to the outside diameter of the battery, that length being 22 mm in the case of the battery with an outside diameter of φ18 mm in this comparative example. Ultimately, in battery (C) of this comparative example, an electrode lead with a very small cross-sectional area of 0.16 mm$^2$ and a length of 35 mm when those of the positive electrode and negative electrode are combined, lies between the battery element and the external terminals.

As conducted in Examples 3 and 4, with this invention, by positioning the end of electrode of the negative electrode at the outermost periphery of the battery element, housing the battery element in the metallic casing and then reducing the outside diameter of the said metallic casing, good electric conduction between the negative electrode and the metallic casing can be obtained, making it unnecessary to spot weld the negative electrode lead to the casing bottom. This enables the battery element to be impregnated with electrolyte and the battery element housed in the metallic casing, something which will lead to significant improvements in the battery manufacturing process. Specifically, this method in which the battery element is impregnated with electrolyte and the battery element then housed in the metallic casing allows the elimination of the process in which electrolyte is injected into the metallic casing.

As shown in the comparative example, however, to obtain the electrical conduction between the negative electrode and the metallic casing under a conventional method, the negative electrode lead taken from the battery element is spot welded to the casing bottom. In this case, welding cannot be performed properly if the negative electrode lead is wet with electrolyte, necessitating a method in which the battery element must first be housed in the metallic casing, the negative electrode lead spot welded to the casing base, and the electrolyte injected a little at a time over a number of times into the metallic casing and then impregnated into the battery element.

Performance Test Results

Ten of each of battery (A), (B) and (C) were made in the aforementioned manner on which performance experiments were conducted. Ten cycles of charging-discharging were conducted by setting the charging voltage of each of the batteries at 4.2 V, charging them for eight hours at a charging current of 500 mA, then discharging at a discharge current of 500 mA to a cut-off voltage of 3.0 V. In the discharge characteristic of the tenth cycle, a discharge capacity of 1200 mAh at an average discharge voltage of 3.75 V was obtained for all, except one of the ten (C) batteries of the comparative example. Table 1 shows the average internal resistance values for each type of battery after charging for the tenth cycle.

TABLE 1

|  | number of sample | internal resistance (milliohms) |
| --- | --- | --- |
| Battery A | 10 | 53 |
| Battery B | 10 | 50 |
| Battery C | 9 | 62 |

The above results show that batteries (A) and (B) of this invention achieved a 15–20% reduction in internal resistance without any deterioration of discharging characteristics in comparison with battery (C) of the conventional method. This is because this invention allows the electrode lead, which needs to have a very small cross-sectional area, to be made very short. A 15–20% reduction in internal resistance means a 15–20% reduction in the internal heating of the battery even when large currents are being discharged, which is of great significance from a safety perspective. In conventional battery (C) the entire 15–20% of extra heat arises only at the electrode leads which have very small heat capacity in relation to the total heat capacity inside the battery, leading to large temperature increases of the electrode leads when large currents are being discharged. This means that the electrode leads may become the source of ignition, particularly in the lithium ion secondary battery shown in this embodiment which uses combustible, organic electrolyte, causing the battery to catch fire.

There was also one battery amongst the ten (C) batteries which did not function properly due to poor electric conduction between the metallic casing and the electrode. It is not possible when making battery (C) to confirm whether the welding of the negative electrode lead to the center of the casing bottom has been properly conducted or not, thus batteries may be created which do not function fully due to poor electrical conduction between the metallic casing and the electrode. The battery may also be subjected to vibrations in processes after the welding of the electrode lead, causing the welding to dislodge, with sufficient likelihood that the electrical conduction between the metallic casing and the electrode will be poor.

In contrast, batteries (A) and (B) of the embodiments involved the battery element being housed in a cylindrical metallic casing, and the outside diameter of the said metallic casing being reduced, thus enabling very close contact over a large area between the end of electrode (electrode current collector) positioned at the outermost periphery of the battery element and the inside of the metallic casing. This means that there will be no batteries which do not function due to poor electric conduction between the metallic casing and the electrode.

Furthermore, in Examples 3 and 4, a specific embodiment for the second invention indicated a lithium ion secondary battery using lithium-manganese oxide as the positive electrode active substance, and a carbon material as the negative electrode active substance; this second invention is essentially concerned with proposals for methods of obtaining the electric conduction between electrodes and the external terminals. Non-aqueous cylindrical batteries naturally can be applied to other battery systems if they are batteries with a battery element that has a coiled structure.

As the "outside diameter of the casing bottom" (L3=C) of the metallic casing prior to Swaging in this invention is no more than the outside diameter of the metallic casing (L2=A) in the finished battery, (A≧C), there is no change in the "outside diameter of the casing bottom" (L3) even after Swaging. Thus, there is no bulging of the bottom of the metallic casing in the Swaging process, enabling batteries with the same external appearance as conventional batteries (having a flat bottom) to be made with the Swage Method, and making possible battery manufacturing by the Swage Method characterized by boosted capacity due to a bigger battery element diameter.

Furthermore, the coiled battery element in this invention is made by finishing the winding so as the end of electrode or electrode current collector of the negative electrode or the positive electrode is positioned at the outermost periphery of the battery element, then the said battery element is housed in the metallic casing, after which the outside diameter of the said metallic casing is reduced, thus the end of an electrode or electrode current collector positioned at the outermost periphery of the battery element is in very close contact under high contact pressure with the inside wall of the metallic casing. This ensures a good electrical conduction between either the negative electrode or the positive electrode and the metallic casing which is the external terminal of the electrode.

In the method in which a metallic rod is inserted into the hole in the center of the coiled battery element, to one end of said metallic rod is welded the electrode lead brought into the center of the coiled battery element, and a lid welded to the other end of the said metallic rod, there is no need to fold the electrode lead to enable the installation of the lid as in conventional methods, meaning that only a very short electrode lead is required. Accordingly, under this invention there will be no batteries which do not function fully due to poor electric conduction between the metallic casing and the electrode, boosting battery reliability. As this invention requires only a very short electrode lead, which needs to have a very small cross-sectional area, there is also no concern about temperature increases in the electrode lead due to the passage of large currents. This removes the danger of batteries catching fire when the electrode lead becomes the source of ignition, particularly in non-aqueous cylindrical batteries which use combustible organic electrolyte. Eliminating the need to spot weld the electrode lead to the casing bottom also allows the housing of the battery element after electrolyte has been impregnated into the battery element, enabling the removal of the process of injecting electrolyte into the metallic casing, which has seriously hampered productivity.

As a result, the mass supply of high performance batteries of great reliability and safety for a broad range of applications has been made possible, having enormous industrial value.

I claim:

1. A cylindrical battery comprising a metallic casing used for the making of a cylindrical battery in which the outside diameter of the metallic casing of the finished battery is L2=A, and characterized by the external dimension of the metallic casing satisfying the relationship L2>A≧L3, L2 being the outside diameter at the central part of the metallic casing, and L3 being the outside diameter of the casing bottom where, as shown in FIG. 1($a$) in a cross-section of the cylindrical metallic casing, the outside diameter L3 measured at the points $P_1$ and $O_1$ where the extended line X-Y of the flat casing bottom inner surface and the casing wall external surface cross is defined as the outside diameter of the casing bottom.

2. A metallic casing for cylindrical batteries comprising said metallic casing and being used for the making of cylindrical batteries in which the outside diameter of the metallic casing of the finished battery is L2=A, and characterized by the external dimension of the metallic casing satisfying the relationship L2>A≧L3, L2 being the outside diameter at the central part of the metallic casing, and L3 being the outside diameter of the casing bottom where, as shown in FIG. 1($a$) in a cross-section of the cylindrical metallic casing, the outside diameter L3 measured at the points $P_1$ and $O_1$ where the extended line X-Y of the flat casing bottom inner surface and the casing wall external surface cross is defined as the outside diameter of the casing bottom.

3. A non-aqueous cylindrical battery comprising a battery element, which consists of a strip-shaped positive electrode and negative electrode, which have metallic foil of no more than 0.03 mm in thickness as a current collector, being separated by a separator and wound into a jelly roll and being housed and sealed in a cylindrical metallic casing; in which said non-aqueous cylindrical battery an end of an electrode or electrode current collector of either the positive electrode or negative electrode is positioned on the outermost periphery of the aforementioned battery element, and after the said battery element has been housed in the aforementioned metallic cylindrical casing the outside diameter of the said cylindrical casing is reduced to give the non-aqueous cylindrical battery with a characteristic of increased contact strength between said end of an electrode or electrode current collector which is positioned at the outermost periphery of the battery element and the inner wall of the aforementioned metallic casing, the contact strength being defined as the difference D–d between the maximum outside diameter value D, in terms of mm, of the battery element prior to insertion in the metallic casing and the maximum inside diameter value d, in terms of mm, of the metallic casing in the finished battery.

4. A non-aqueous cylindrical battery as defined in claim 3 which is characterized by the contact strength satisfying 0<(D–d)≦0.3.

5. A non-aqueous cylindrical battery as defined in claim 3 which is characterized by the battery element being inserted into the metallic casing after impregnation with electrolyte.

6. A non-aqueous cylindrical battery as defined in claim 3 comprising a cylindrical battery formed by housing a battery element in a cylindrical metallic casing and an opening of said cylindrical metallic casing having a lid affixed to it via a gasket and being sealed; in which cylindrical battery a metallic rod is inserted into a hole in the center of said battery element, to one end of which said metallic rod is welded a positive electrode lead or a negative electrode lead, and to the other end of which is welded said lid.

7. A non-aqueous cylindrical battery as defined in claim 4 which is characterized by the battery element being inserted into the metallic casing after impregnation with electrolyte.

8. A non-aqueous cylindrical battery as defined in claim 4 comprising a cylindrical battery formed by housing a battery element in a cylindrical metallic casing and an opening of said cylindrical metallic casing having a lid affixed to it via a gasket and being sealed; in which cylindrical battery a metallic rod is inserted into a hole in the center of said battery element, to one end of which said metallic rod is welded a positive electrode lead or a negative electrode lead, and to the other end of which is welded said lid.

9. A non-aqueous cylindrical battery as defined in claim 5 comprising a cylindrical battery formed by housing a battery element in a cylindrical metallic casing and an opening of said cylindrical metallic casing having a lid affixed to it via a gasket and being sealed; in which cylindrical battery a metallic rod is inserted into a hole in the center of said battery element, to one end of which said metallic rod is welded a positive electrode lead or a negative electrode lead, and to the other end of which is welded said lid.

10. A non-aqueous cylindrical battery as defined in claim 7 comprising a cylindrical battery formed by housing a battery element in a cylindrical metallic casing and an opening of said cylindrical metallic casing having a lid affixed to it via a gasket and being sealed; in which cylindrical battery a metallic rod is inserted into a hole in the center of said battery element, to one end of which said metallic rod is welded a positive electrode lead or a negative electrode lead, and to the other end of which is welded said lid.

* * * * *